United States Patent [19]
Ruthner

[11] Patent Number: 5,108,461
[45] Date of Patent: Apr. 28, 1992

[54] PROCESS FOR PRODUCING CERAMIC POWDERS

[76] Inventor: Michael J. Ruthner, Aichereben 18, A-4865 Nussdorf am Attersee, Austria

[21] Appl. No.: 536,072

[22] Filed: Jun. 11, 1990

Related U.S. Application Data

[63] Continuation of Ser. No. 266,324, Oct. 31, 1988, abandoned, which is a continuation of Ser. No. 807,242, Dec. 10, 1985, abandoned.

[30] Foreign Application Priority Data

Dec. 17, 1984 [AT] Austria ............... 3990/84

[51] Int. Cl.$^5$ ............................................. B01S 2/00
[52] U.S. Cl. ................................ 23/313 R; 23/313 AS; 423/659; 423/DIG. 15; 501/1; 501/150; 432/13; 432/95; 432/102
[58] Field of Search ............... 423/659, DIG. 7, 9, 423/DIG. 15; 432/13, 95, 102; 23/313 R, 313 AS; 501/1, 150

[56] References Cited

U.S. PATENT DOCUMENTS

| | | | |
|---|---|---|---|
| 1,992,669 | 2/1935 | Labus ..................... | 432/13 |
| 2,048,668 | 7/1936 | Baensch et al. ......... | 432/95 |
| 2,493,304 | 1/1950 | McCready et al. ...... | 432/95 |
| 2,676,892 | 4/1954 | McLaughlin ............ | 432/13 |
| 3,309,170 | 3/1967 | Griswold ................ | 423/279 |
| 3,647,357 | 3/1972 | Weidner et al. ........ | 423/659 |
| 3,862,294 | 1/1975 | Engelhart et al. ..... | 423/155 |
| 3,882,034 | 5/1975 | Gibbons ................. | 423/279 |
| 4,080,422 | 3/1978 | McCleary ............... | 423/172 |
| 4,155,705 | 5/1979 | Nudelman et al. ..... | 432/95 |
| 4,412,978 | 11/1983 | Ertle ....................... | 423/279 |
| 4,497,761 | 2/1985 | Schulte ................... | 423/636 |

FOREIGN PATENT DOCUMENTS 356630 10/1979 Austria .

OTHER PUBLICATIONS

*Industrieofen*, VEB Deutscher Verlag für Grundstoffindustrie Leipzig, 1969, pp. 98-100.

*Primary Examiner*—R. Bruce Breneman
*Attorney, Agent, or Firm*—Fleit, Jacobson, Cohn, Price, Holman & Stern

[57] ABSTRACT

Conventional presintering and reaction presintering processes for the production of ceramic powders yield products exhibiting an undesired primary particle size distribution along with localized distribution of impurities, which give rise to the formulation of undesired duplex structures during final sintering.

In order to avoid formation of undesired duplex structures within sintered ceramic parts a process and a device for producing ceramic powders based on single- or multi-phase metal oxides (including $SiO_2$ - compounds), exhibiting a narrow particle size distribution, i.e. with a maximum deviation of the primary crystal size (REM) of $+/- 0.75$ μm, preferentially less than $+/- 0.25$ μm, within an average particle size of 0.05 up to 10.0 μm, is conceived. The raw feed material exhibits a specific surface area of 0.05 up to 500 $m^2/g$ (BET), preferentially 5.0 up to 50 $m^2/g$ and is treated in an indirectly heated drop tube furnace in form of classified granules exhibiting an average diameter of 10 up to 2500 μm, preferentially 25 up to 250 μm, for a period from 0.5 up to 15 seconds, preferentially 1.5 up to 5 seconds, at a temperature of 500° up to 3500° K., preferentially up to 2500° K., whereby the raw feed material flows freely into the furnace via a charging device and drops by action of gravity, in a quasi free-falling manner, through the furnace atmosphere, which is oxidizing, inert or reducing. The drop tube furnace has at least one drop tube strand, the temperature profile of each strand is divided into a plurality of temperature zones. A cooling system is disposed after the last heated temperature zone.

By using accordingly processed ceramic powders it becomes possible to produce sintered ceramic parts, exhibiting a uniform microstructure, which is essentially free of undesired duplex structures.

11 Claims, 5 Drawing Sheets

PROCESS FOR PRODUCING CERAMIC POWDERS

This application is a continuation of application Ser. No. 07/266,324, filed Oct. 28, 1988, now abandoned, which is a continuation of application Ser. No. 06/807,242, filed Dec. 10, 1985, now abandoned.

FIELD OF THE INVENTION

The present invention relates to a process and apparatus for producing ceramic powders based on single- and/or multi-component metal oxides, and mixtures thereof such as metal oxides, metal oxide mixtures, ferrites and $SiO_2$-compounds, with a narrow primary particle size distribution, i.e. with a maximum deviation of the primary particle size (REM) of $+/-0.75$ $\mu$m, preferentially smaller than $+/-0.25$ $\mu$m, as well as within the particle size range of 0.05 up to 10.0 $\mu$m. The ceramic powder compositions produced are suitable for production of ferrites, titanates, spinels, zirconates, garnets, silicates, magnesium oxide, aluminium oxide, ceramic pigments, polishing agents, oxide ceramic carrier materials, as well as refractory materials, and are subsequently either used directly or in subsequent process steps pressed into parts and sintered in a manner known per-se.

BACKGROUND OF THE INVENTION AND PRIOR ART DISCUSSION

The pertinent prior art in this field is best illustrated by the flow diagrams, as presented, for example, in FIGS. 1 and 2 of the drawings, and those of the relevant literature, compare, in respect of FIG. 1; 'Bulletin de la Societé Ceramique', C 525, A 43, and in respect of FIG. 2 'Firma Eirich Fachberichte Ausgabe 21/1980'. It is evident therefrom that multistep and sophisticated processes are always involved.

Furthermore there are other known processes for the production of ceramic powders, which are characterised by spraying solutions or suspensions into directly or indirectly heated reaction chambers (e.g. spray roasters). Such processes have also often been described in the literature. A few examples originating from patent literature may be listed: U.S. Pat. No. 3,378,335, DE-AS 24 03 900 and European Patent 0 011 265.

Production of pre-sintered or reaction-sintered ceramic powders occurs in a known manner by means of plate push-type furnaces, chamber kilns, rotary kilns, pendulum kilns, as well as by using fluidised bed reactors and spray roaster furnaces.

The degree of pre-sintering and the chemical and physical properties of the ceramic powders produced by means of these processes are in such cases subject to considerable process-dependent fluctuations in the material properties, which may cause problems in subsequent process steps and yield inferior product qualities.

In the above-mentioned processes for the production of ceramic powders, in particular it is not possible for various reasons to provide the developing ceramic reaction product, especially the individual particles, which, for their part, create aggregates and agglomerates, with one and the same thermal and chemical treatment. This fact necessarily leads to the formation of particles exhibiting different chemical analysis and a widely scattered particle size distribution, which may not be corrected in a desired way by subsequent, and often undesired, milling procedures. Highly complex milling and upgrading processes have been discussed in this connection, such as, for example, in the work by Ochiai and Okutani in 'Advances in Ceramics', Vol 15, 16 (1984/85); Amer. Cer. Soc.

In directly heated pre-sintering furnaces (or reaction-sintering furnaces) e.g. in the spray roasting process, the quality of the furnace atmosphere is strongly dependent on the composition of the combustion gases and may not be freely selected in a desirable manner.

When producing, for example, alpha ferric oxide, which is an important raw material for ferrite production, the above-mentioned facts lead to the production of varying undesired contents of maghemite (gamma ferric oxide) and magnetite (ferrosoferric oxide), as has also already been described in literature. See Fick and Zenger 'Advances in Ceramics' Vol. 17 and 18 (1984/85); Publisher: Amer. Cer. Soc.

Spray roasting is characterised by spraying droplets, which have a diameter of 20 up to 500 $\mu$m into a roaster furnace; also have the above-mentioned references. Due to process conditions, the reaction and combustion gases form a cyclone, which causes the smaller droplets or agglomerates of the roasted products to experience a higher degree of uplift and receive therefore a different thermal treatment in comparison to larger droplets or larger agglomerates of the roasted products. This fact results in products being obtained consisting of primary single crystals having very different particle sizes. Furthermore, processes especially for presintering and reaction-sintering, which require an extended processing time, give rise to a crystal or particle growth to an extent resulting automatically in accumulation of originally finely dispersed impurities.

The undesired distribution of impurities and subsequent milling operations which, for economic reasons, are not sufficient to disperse impurities finely again are, together with the widely scattered particle size distribution, responsible for the formation of so-called ceramic duplex structures by utilisation of such ceramic powders in ready-sintered shaped ceramic parts which adversely affect the quality of the material properties.

OBJECTS OF THE INVENTION

The present invention has as an object to ensure the production of ceramic powders consisting of aggregates and agglomerates of a predetermined particle or primary crystal size within the micron and submicron range, exhibiting consistent chemical analysis as well as a narrow particle size distribution, by means of a new pre-sintering and/or reaction-sintering process. What is understood by particle size is a definition according to DIN 53206, Leaflet 1, page 2, paragraph 1.1. Furthermore, the product should be kept free of process-related impurities.

SUMMARY OF THE INVENTION

The process according to the invention is characterised in that a raw material and/or a mixture, comprising at least one of the components: metal, metal oxide, metal hydroxide, metal salt, $SiO_2$-compounds and exhibiting a specific surface area of 0.05 to 500 m$^2$/g (BET), preferentially 5.0 up to 50 m$^2$/g, is treated in a furnace in the form of classified granules exhibiting an average diameter of 10 up to 2500 $\mu$m, and preferentially 25 up to 250 $\mu$m, for 0.5 up to 15 sec., preferentially 1.5 up to 5 sec., the furnace operating at a temperature of 500° up to 3500° K., preferentially up to 2500° K., whereby the feed material flows freely and drops by the action of gravity, in a quasi free-falling manner, through the furnace atmosphere, which is oxidising, inert or reducing.

The process is further characterized in that it includes the steps of collecting the cooled-off discharged reaction sintered agglomerates and deagglomerating the cooled-off agglomerates into primary particles by means of an ultrasonic milling device, a sand mill or a jet mill to produce a ceramic powder.

The process allows for the velocity of the free falling classified granules through the furnace atmosphere to be minimally reduced or accelerated by contact with reaction gases supplied to said drop furnace strand.

The device for executing the process according to the invention is characterised in that the furnace is a drop tube furnace with at least one drop tube strand and a device for providing the free-flowing conditions for the raw material which is in its solid aggregate state.

Depending on the desired quality of the final product, the furnace atmosphere is inert e.g. argon, $N_2$ or oxidising or reducing with adjustable oxidising or reducing conditions.

DESCRIPTION OF PREFERRED EMBODIMENT

Figure 1:
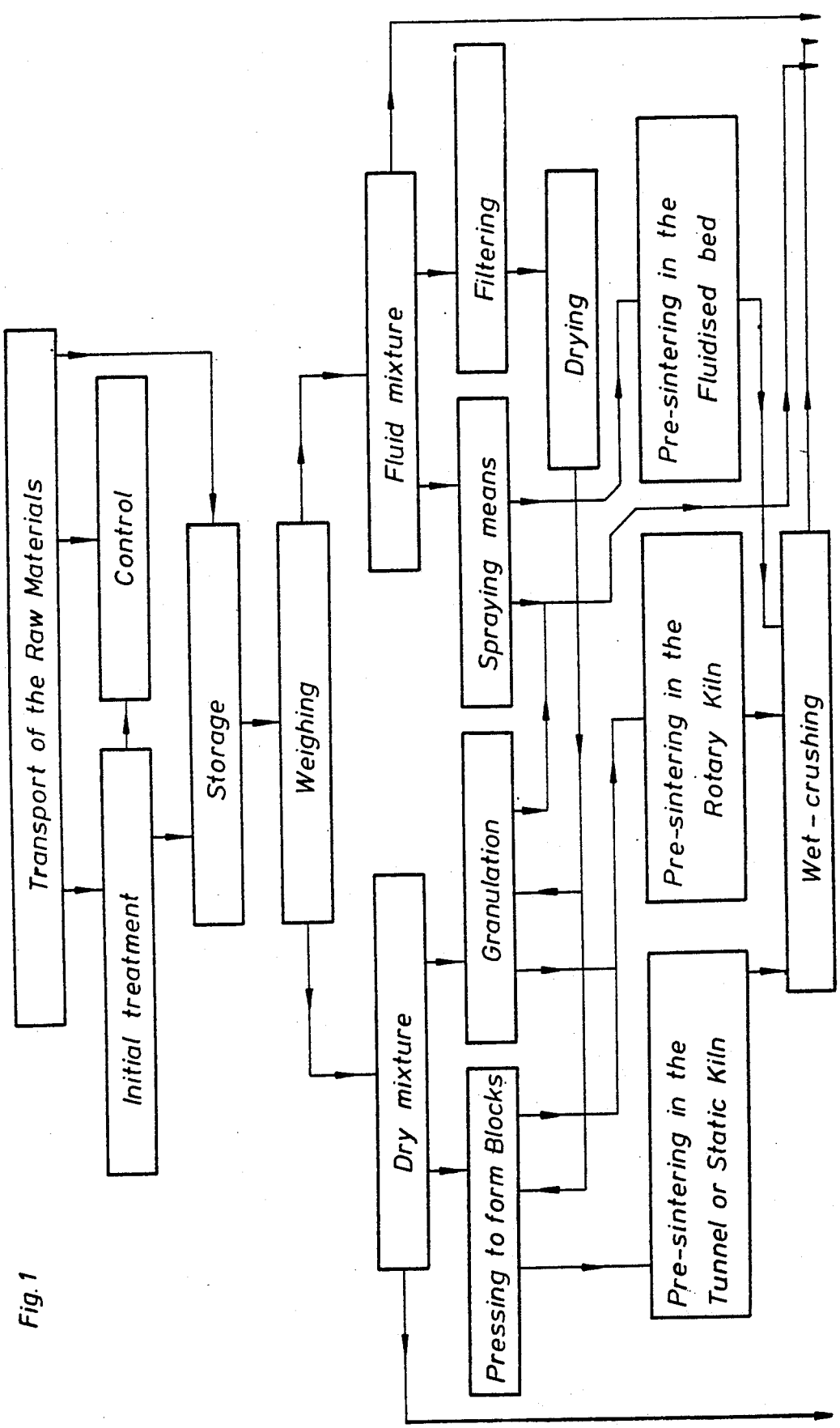
FIGS. 1, 1a, 2, 2a are flow-diagrams illustrating prior art processes as referred to above.
Figure 1A:
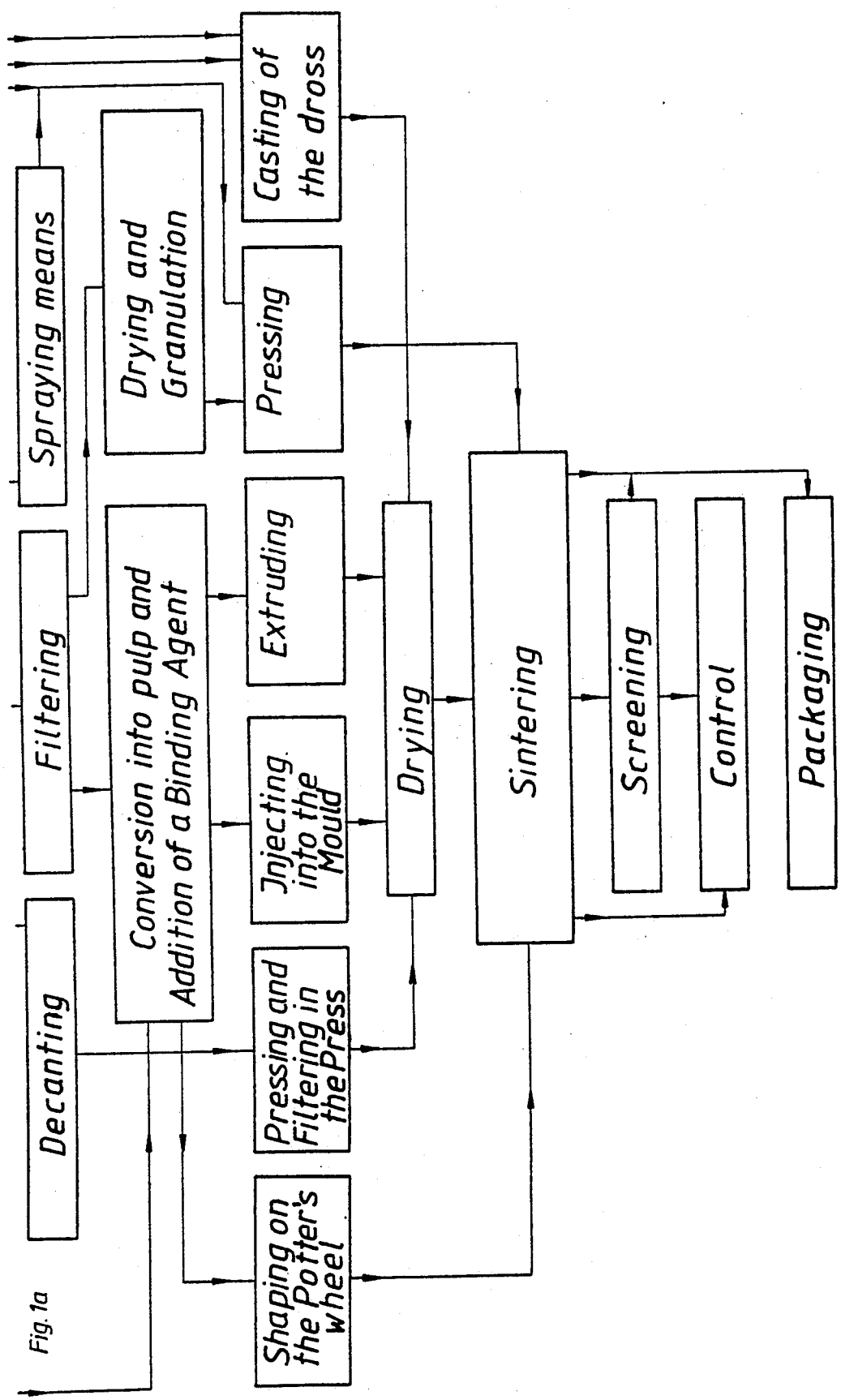
Figure 2:
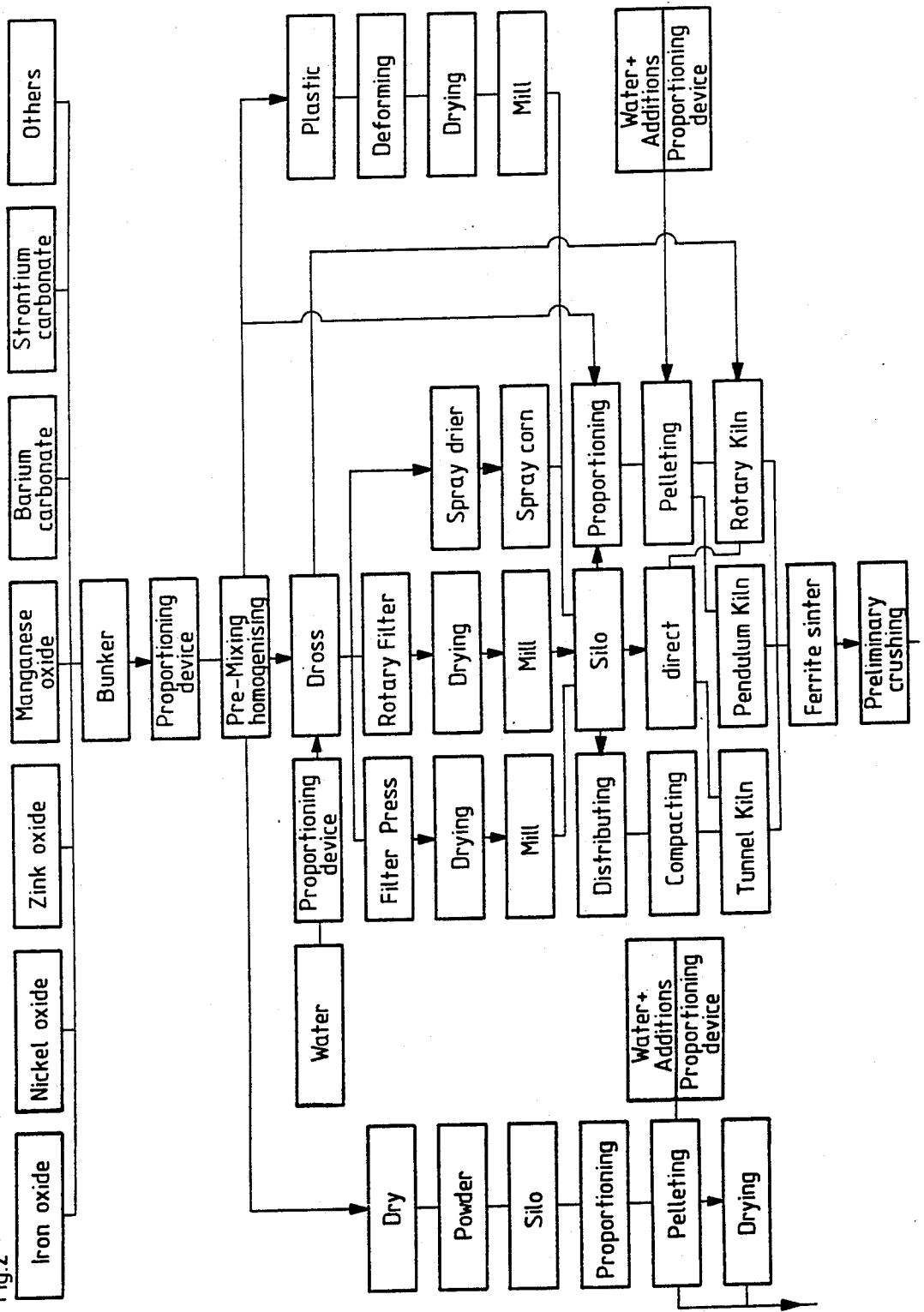
Figure 2A:
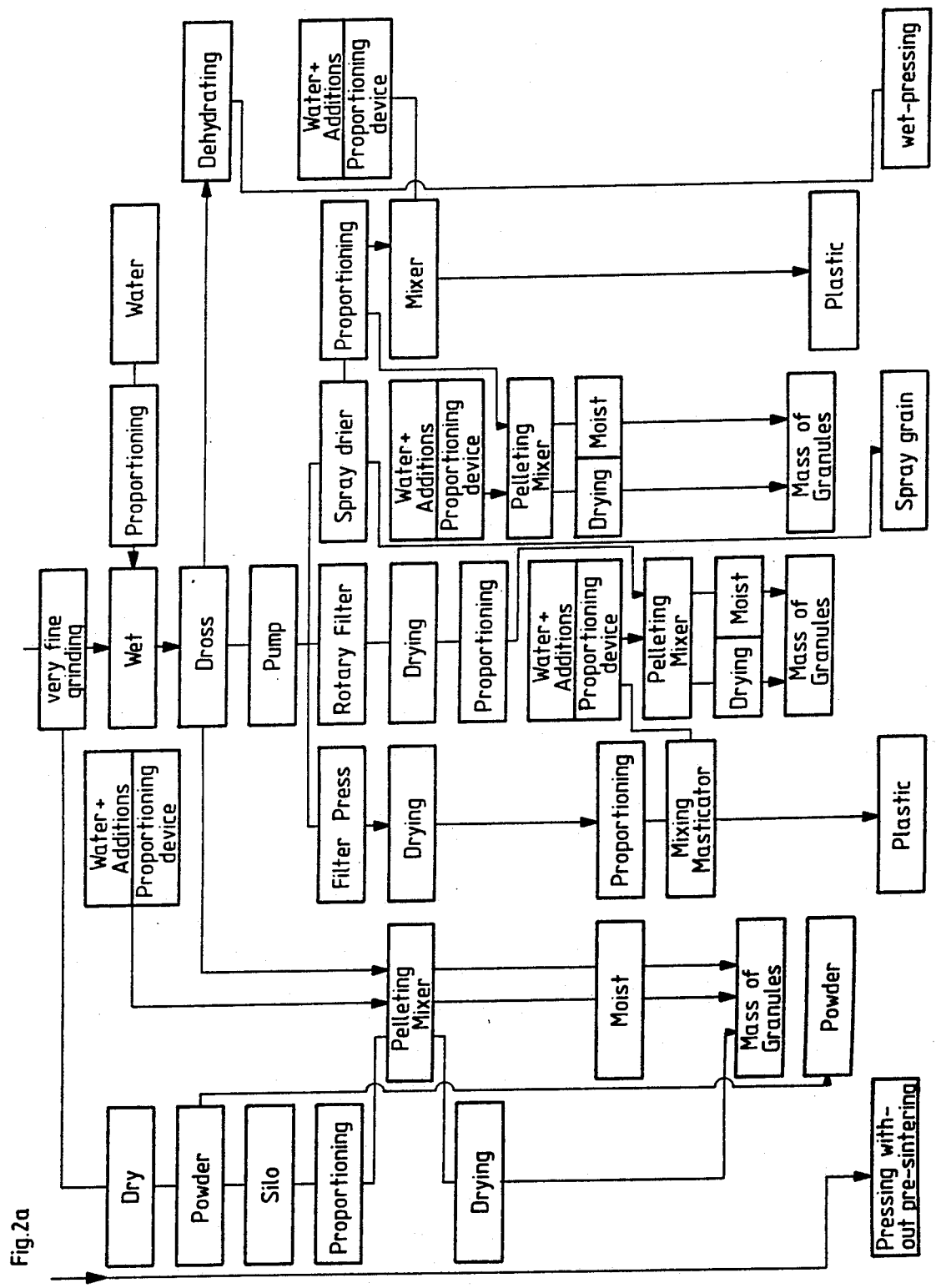
Figure 3:
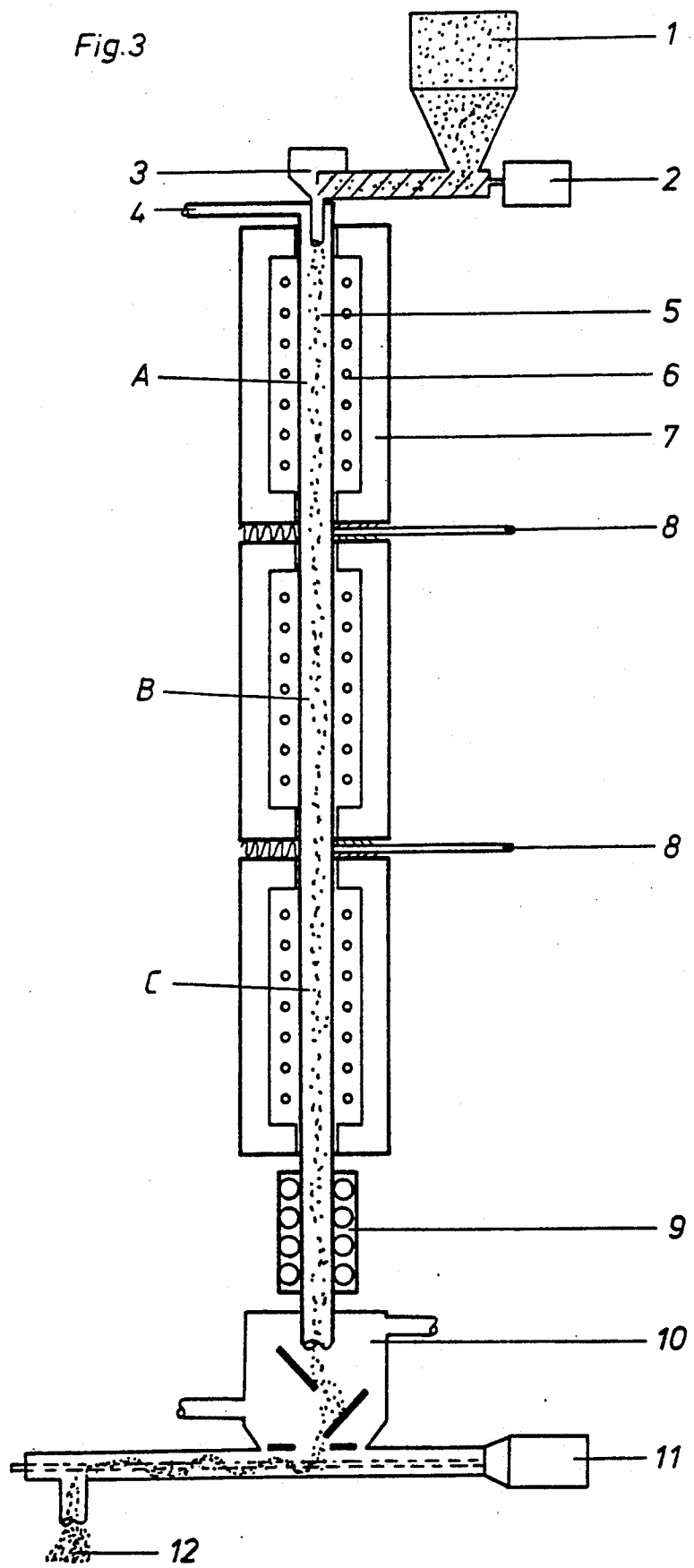
FIG. 3 is a schematic representation of the process according to the invention as well as the associated device in the form of a vertical drop tube furnace which is, for example, divided into three temperature zones A, B and C.

As illustrated in FIG. 3, a silo 1 contains the raw material exhibiting the predetermined material properties. Granules of raw material are introduced, by means of a proportioning device 2, for example in the form of a screw, and a charging device 3, for example in the form of a funnel, into the drop furnace strand 5 which is surrounded by an indirect heater 6 and a good insulation 7 and where the granules, for example, in the quasi free-falling manner are brought to reaction temperature within a few seconds and, corresponding to the furnace atmosphere which is predetermined by piping system 8, are converted into reaction products exhibiting controllable material properties. Subsequent cooling systems 9, 10, 11 in the form of cooling flaps, cooling coils, cooling boxes, cooling plates or the like, cool-off the formed ceramic powders 12, possibly under controlled cooling-off conditions, e.g. cooling in air, in water, in liquid gases or cooling off under adjustable oxidizing, reducing or inert conditions down to room temperature. The formed reaction gases are drawn-off either via the furnace port 4 or via the bottom of the furnace 10. It is understood that the drop tube strand 5 may also be divided into more than three temperature zones.

For the pre-heating of the raw material granules, heating devices may be provided in the proportioning device or in the charging device.

The invention is explained in more detail hereinafter by means of examples of experiments, which have been carried out using a vertical drop tube strand having four temperature zones A, B, C and D.

EXPERIMENT 1

Object: Production of Manganese-Zinc-Ferrite Powder Exhibiting a Primary Particle Size of 0.4 μm A raw material mixture consisting of the following composition: 14.5 wt. % MnO, 13.5 wt. % ZnO and 72.0 wt. % $Fe_2O_3$, was milled in a ball mill and the resultant suspension was spray-dried. A granular size of 37 μm up to 88 μm was screened and stored in the silo. The granules had a residual moisture content of 0.5 wt. %. The specific surface area (BET) was 8.0 m²/g.

The process conditions within the vertical drop tube furnace as well as the material properties of the particular powder have been recorded herebelow.

Process Conditions in the Drop Tube Furnace

1. Feed quantity (g/min.): 100
2. Feeding device: proportioning screw
3. Temperature profile in °K.:
   Zone A 1100; Zone C 1400;
   Zone B 1250; Zone D 1400:
4. Retention time (sec.): 2.5
5. Wall deposits: traces (zone B)
6. Bulk density (g/l): 865
7. Furnace atmosphere: air
8. Aftertreatment of product: cooling in air
9. Comment:

Product Data

1. Surface area (m²/g): 3.15
2. Phases: spinel; raw materials not to be detected.
3. Primary particle size (μm): 0.39
   Particle distribution: (μm) 0.30–0.45
   Particle form: spherical
4. Agglomerate or aggregate size (μm): 20–60
   Strength: poor
5. Extrudability: fair
6. Bulk density (g/l): 1540
7. Degree of impurities (ppm): minus 520 ppm salt contents
8. Produced quantities
   (g/test): 360.000
   (g/min) 103.5
9. Comment:

EXPERIMENT 2

Object: Production of Nickel Ferrite Powders with a Primary Particle Size of Approx. 0.4 μm A raw material mixture consisting of the following composition: 63.26 wt. % $Fe_2O_3$ and 36.73 wt. % Ni-$(OH)_2$ was milled in a sand mill, and the resultant suspension was spray-dried.

A granular size of between 44 μm and 105 μm was screened and transferred to the silo. Residual moisture: 0.38 wt. %. The specific surface area of the granules was 12.0 m²/g.

The process conditions within the vertical drop tube furnace as well as the material properties of the particular powder have been recorded herebelow.

Process Conditions in the Vertical Drop Tube Furnace

1. Feed quantity (g/min.): 100
2. Feeding device: vibrating proportioning chute
3. Temperature profile in °K.:
   Zone A 1000; Zone C 1400;
   Zone B 1350; Zone D 1405;
4. Retention time (sec.): 2.6

5. Wall deposits: none
6. Bulk density (g/l): 920
7. Furnace atmosphere: air
8. After treatment of product: cooling in air
9. Comment:

Product Data

1. Specific surface area (m$^2$/g): 2.6
2. Phases: nickel ferrite, traces of unidentified phases.
3. Particle size (μm): 0.46
Particle distribution (μm): 0.4–0.5
Particle form: spherical
4. Agglomerate or aggregate size (μm): 25 up to 65 μm
Strength: poor
5. Extrudability: possible
6. Bulk density (g/l): 1640
7. Degree of impurities (ppm): minus 650 Cl' and SO$_3$"
8. Produced quantities
(g/test): 270.000
(g/min.): 93.2
9. Comment.

EXPERIMENT 3

Object: Production of MgO Powder Exhibiting a Primary Particle Size (REM) of 1 μm.

A raw material mixture consisting of the following composition: 98.5 wt. % MgO, 0.2 wt. % CaO and 0.3 wt. % SiO$_2$, which was present as spray-roasted magnesium oxide having a specific surface area of 12.5 m$^2$/g and an agglomerate size of 30 up to 250 μm, has been charged directly with a material temperature of 800° K. by means of a proportioning chute into the vertical drop tube furnace.

The process conditions within the drop tube furnace as well as the material properties of the particular powder have been recorded herebelow.

Process Conditions in the Drop Tube Furnace

1. Feed quantity (g/min.): 100
2. Feeding device: proportioning screw
3. Temperature profile in °K.:
Zone A 1850; Zone C 2050;
Zone B 2050; Zone D 2000;
4. Retention time (sec.) 4.7
5. Wall deposits: none
6. Bulk density (g/l): 380
7. Furnace atmosphere: air
8. Aftertreatment of product: slowly cooled in air
9. Comment: countercurrent guidance of the waste gas in the furnace.

Product Data

1. Specific surface area (m$^2$/g): 1.85
2. Phases: periclase
3. Primary particle size (μm): 0.93
Particle distribution (μm): 0.8–1.2
Particle form: spherical
4. Agglomerate or aggregate size (μm): 20 up to 160 μm
Strength: poor
5. Extrudability: good
6. Bulk density (g/l): 1280
7. Degree of impurities (ppm): 600 less Cl', SO$_3$
8. Produced quantities
(g/test): 450.000
(g/min.): 98.9
9. Comment:

EXPERIMENT 4

Object: Production of Ceramic Carrier Material Based on Converted SiO$_2$-Rich Upgrading Residues A raw material mixture comprising the following composition: 80.1 wt. % SiO$_2$, 2.1 wt. % Al$_2$O$_3$ 0.5 wt. % Fe$_2$O$_3$ as well as 1.0 wt. % K$_2$O and 2.5 wt. % borax. The remaining parts of the contents were substantially crystal water and moisture. The specific area of the raw material was 218.0 m$^2$/g. Micro pellets exhibiting diameters of 500 up to 1500 μm have been charged.

The process conditions within the drop tube furnace as well as the material properties of the particular powder have been recorded herebelow.

Process Conditions in the Drop Tube Furnace

1. Feed quantity (g/min.): 250
2. Feeding device: proportioning chute
3. Temperature profile in °K.:
Zone A 1200; Zone C 1350;
Zone B 1350; Zone D 1350;
4. Retention time (sec.): 2.6
5. Wall deposits: slight
6. Bulk density (g/l): 980
7. Furnace atmosphere: air
8. Aftertreatment of product: cooling in air
9. Comment: Addition of K$_2$O and Borax.

Product Data

1. Specific surface area (m$^2$/g): 35.5
2. Phases: silicates SiO$_2$ glasses.
3. Primary particle size (μm): 0.06
Particle distribution: 0.03–0.08 μm
Particle form: spherical; plate-like.
4. Agglomerate or aggregate size (μm): 200–1200
Strength: good
5. Extrudability: possible
6. Bulk density (g/l): 1675
7. Degree of impurities (ppm): minus 2000 ppm Cl'
8. Produced quantities
(g/test): 400.000
(g/min): 235
9. Comment.

EXPERIMENT 5

Object: Production of a Strontium Ferrite Powder Exhibiting an Average Particle Size of 0.8 μm A raw material mixture consisting of the following composition: 15 wt. % SrCO$_3$ and 85.0 wt. % Fe$_2$O$_3$ was wet milled in a sand mill, and the resultant suspension was spray-dried. A granular size of 37 μm to 74 μm was screened by means of a vibrating screen and charged to the silo. Residual moisture: 0.35 wt. %. The specific surface area (BET) was 7.6 m$^2$/g.

Process conditions within the drop tube furnace as well as the material properties of the particular powder have been recorded herebelow.

Process Conditions in the Drop Tube Furnace

1. Feed quantity (g/min.) 100
2. Feeding device: proportioning chute
3. Temperature profile in °K.:
Zone A 1300; Zone C 1600;
Zone B 1500; Zone D 1580;
4. Retention time (sec.): 2.8

5. Wall deposits: none
6. Bulk density (g/l): 1150
7. Furnace atmosphere: air
8. Aftertreatment of product: cooling in air
9. Comment:

Product Data

1. Specific surface area (m²/g): 1.45
2. Phases: hexaferrite, traces of other phases.
3. Primary particle size (μm): 0.78
Particle distribution: 0.7–0.9 μm
Particle form: spherical, plate-like
4. Agglomerate or aggregate size (μm): 25–60
Strength: remarkable
5. Extrudability: possible
6. Bulk density (g/l): 1760
7. Degree of impurities (ppm): minus 750 ppm Cl′, $SO_3$
8. Produced quantities:
(g/test): 500.000
(g/min.): 95.8
9. Comment

EXPERIMENT 6

Object: Production of $Ce_2O_3$ Exhibiting an Average Particle Size of 0.2 μm Originating from Cerium Chloride Heptahydrate.

Cerium chloride heptahydrate has been crushed by mechanic means, and the classified granules of 44.0 up to 88 μm have been transferred to the silo.

The residual moisture was approx. 0.5 wt. %.

The process conditions within the drop tube furnace as well as the material properties of the particular powder have been recorded herebelow.

Process Conditions in the Drop Tube Furnace

1. Feed quantity (g/min.): 4.2
2. Feeding device: proportioning chute
3. Temperature profile in °K.:
Zone A 800; Zone C 1350;
Zone B 1250; Zone D 1350;
4. Retention time (sec): 2.9
5. Wall deposits: none
6. Bulk density (g/l): 865
7. Furnace atmosphere: $N_2$, HCl, $H_2O$, 7.5 vol. % $O_2$, $NO_x$
8. Aftertreatment of product: Saturated steam 520° K.
9. Comment: waste gas has been extracted from the furnace port.

Product Data

1. Specific surface area (m²/g): 4.2
2. Phases: $Ce_2O_3$ (alpha)
3. Primary particle size (μm): 0.2
Particle distribution: 0.1–0.3 μm
Particle form: prismatic.
4. Agglomerate or aggregate size (μm): 20–60
Strength: good
5. Extrudability: fair
6. Bulk density (g/l): 1460
7. Degree of impurities (ppm): low Cl′-contents: 70 ppm
8. Produced quantities
(g/test): 250.000
(g/min.): 105
9. Comment:

EXPERIMENT 7

Object: Production of Pulverulent Alpha-$Al_2O_3$ Exhibiting an Average Particle Size of 0.5 μm.

99.1 wt. % $Al_2O_3.3H_2O$, which has been produced according to Bayer's process, exhibited a specific surface area (BET) of 46.5 m²/g. Granules exhibiting diameters between 45 and 105 μm have been screened and transferred to a raw material silo. The moisture of the product was 0.4 wt. %.

The process conditions within the drop tube furnace as well as the material properties of the particular powder have been recorded herebelow.

Process Conditions in the Drop Tube Furnace

1. Feed quantity (g/min.): 100
2. Feeding device: proportioning chute
3. Temperature profile in °K.:
Zone A 800; Zone C 2050;
Zone B 2050; Zone D 2050;
4. Retention time (sec.) 3.5
5. Wall deposits: none
6. Bulk density (g/l): 680
7. Furnace atmosphere: Air+$H_2O$.
8. Aftertreatment of product: air cooling.
9. Comment:

Product Data

1. Specific surface area (m²/g): 3.35
2. Phases: alpha $Al_2O_3$
3. Primary particle size (μm): 0.44
Particle distribution: 0.35–0.55
Particle form: spherical.
4. Agglomerate or aggregate size (μm) 35–75
Strength: poor
5. Extrudability: fair
6. Bulk density (g/l): 1380
7. Degree of impurities (ppm): minus 250 ppm $SO_3''$
8. Produced quantities
(g/test): 200.000
(g/min.): 62.5
9. Comment:

What is claimed is:

1. Process for producing a ceramic powder, comprising the steps of:
processing and classifying a raw material mixture comprising at least one component selected from the group consisting of metals, metal oxides, metal hydroxides, metal salts, $SiO_2$ and $SiO_2$-containing compositions to form classified granules, the average granule diameter being from 10 to 2500 μm, said classified granules having a specific surface area of 0.05 to 500 m²/g (BET);
establishing a vertical unobstructed reaction zone which is closed at its upper end except for a granule inlet;
indirectly heating an atmosphere comprised of a gaseous medium selected from the group consisting of oxidizing, reducing and inert gases and mixtures thereof within the vertical unobstructed reaction zone to a temperature of from 500° to 3500° K.;
introducing said classified granules into the center of the upper end of the vertical unobstructed reaction zone through the granule inlet, said classified granules freely flowing and dropping by the action of gravity through the heated atmosphere in the vertical unobstructed reaction zone to form reaction sintered agglomerates with the time period during which said classified granules pass through and are heated in said vertical unobstructed reaction zone being from 0.5 to 15 seconds;

introducing said gaseous medium into said vertical unobstructed reaction zone and withdrawing said gaseous medium without disturbing the freely flowing and dropping by the action of gravity of the classified granules;

establishing a vertical unobstructed cooling zone contiguous with the reaction zone for directly receiving sintered agglomerates falling from the reaction zone;

cooling said sintered agglomerates as they transit through the cooling zone;

discharging said agglomerates from the bottom of the vertical unobstructed cooling zone; and then collecting said cooled discharged reaction sintered agglomerates consisting of weakly adherent primary particles which upon deagglomeration will yield a ceramic powder exhibiting a narrow primary particle size distribution with a maximum primary particle size deviation (REM) of less than $+/-0.75$ μm and an average primary particle size of 0.05 to 10 μm.

2. Process according to claim 1, wherein said classified granules have a specific surface area of 5.0 to 50 m$^2$/g (BET) and the average granule diameter is from 25 to 250 μm; wherein the atmosphere within the vertical unobstructed reaction zone is heated to a temperature of from 500° to 2500° K. and the time period during which the classified granules are heated within the tube is from 1.5 to 5 seconds; and wherein upon deagglomeration the reaction sintered agglomerates will yield a ceramic powder exhibiting a narrow primary particle size distribution with a maximum primary particle size deviation (REM) of less than $+/-0.25$ μm.

3. Process according to claim 1, wherein the classified granules are heated prior to being introduced into the vertical unobstructed reaction zone.

4. Process according to claim 1, wherein the velocity of the classified granules falling through the heated atmosphere in the vertical unobstructed reaction zone is minimally reduced by contact with gases present in the atmosphere within the vertical unobstructed reaction zone.

5. Process according to claim 1, wherein the velocity of the classified granules falling through the heated atmosphere in the vertical unobstructed reaction zone is minimally accelerated by contact with gases present in the atmosphere within the vertical unobstructed reaction zone.

6. Process according to claim 1, further comprising the step of deagglomerating the cooled discharged reaction sintered agglomerates into primary particles by means of an ultrasonic milling device, a sand mill or a jet mill to produce a ceramic powder.

7. Process according to claim 1, wherein said raw material mixture comprises at least one component selected from the group consisting of metal oxides, SiO$_2$ and SiO$_2$-containing compositions.

8. Process according to claim 1, wherein the atmosphere in the vertical unobstructed reaction zone is composed of an oxidizing gas.

9. Process according to claim 1, wherein the atmosphere in the vertical unobstructed reaction zone is composed of a reducing gas.

10. Process according to claim 1, wherein the atmosphere in the vertical unobstructed reaction zone is composed of an inert gas.

11. Process according to claim 1, wherein said atmosphere in the vertical unobstructed reaction zone is indirectly heated to create at least two vertically spaced heating zones, each of the heating zones having a temperature of from 500° to 3500° C., with the upper heating zone having a temperature lower than the temperature of the lower heating zone.

* * * * *